United States Patent
Yu et al.

(10) Patent No.: US 10,271,140 B2
(45) Date of Patent: Apr. 23, 2019

(54) INTERACTION METHOD, INTERACTION APPARATUS, AND USER EQUIPMENT

(71) Applicant: BEIJING ZHIGU RUI TUO TECH CO., LTD., Beijing (CN)

(72) Inventors: Kuifei Yu, Beijing (CN); Ran Xu, Beijing (CN)

(73) Assignee: Beijing Zhigu Rui Tuo Tech Co., Ltd., Beijing (CN)

(*) Notice: Subject to any disclaimer, the term of this patent is extended or adjusted under 35 U.S.C. 154(b) by 0 days.

(21) Appl. No.: 15/414,830

(22) Filed: Jan. 25, 2017

(65) Prior Publication Data
US 2017/0230751 A1    Aug. 10, 2017

(30) Foreign Application Priority Data

Feb. 4, 2016  (CN) .......................... 2016 1 0081042

(51) Int. Cl.
*H04R 3/12* (2006.01)
*G06F 3/16* (2006.01)
(Continued)

(52) U.S. Cl.
CPC .................. *H04R 3/12* (2013.01); *G06F 3/16* (2013.01); *H04R 1/403* (2013.01); *H04R 7/122* (2013.01);
(Continued)

(58) Field of Classification Search
CPC .......... H04R 9/06; H04R 1/323; H04R 1/403; H04R 9/04
See application file for complete search history.

(56) References Cited

U.S. PATENT DOCUMENTS

| 2002/0005818 A1 | 1/2002 | Bruzzone |
| 2002/0021258 A1 | 2/2002 | Koenig |

(Continued)

FOREIGN PATENT DOCUMENTS

| CN | 1334690 A | 2/2002 |
| CN | 1628278 A | 6/2005 |

(Continued)

*Primary Examiner* — Mohammad K Islam
(74) *Attorney, Agent, or Firm* — Sheppard, Mullin, Richter & Hampton LLP

(57) ABSTRACT

Embodiments of the present application disclose an interaction method, an interaction apparatus, and user equipment. The method comprises: determining shape related information of a deformable loudspeaker array surface, where the shape related information corresponds to a first shape of the deformable loudspeaker array surface after a folding deformation; determining multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape; and using the multiple effective interaction areas as one interaction area at least according to a first relative position of the multiple effective interaction areas in the spatial position in the first shape to provide a sound output interface to at least one interaction object. The technical solutions in the embodiments of the present application can bring new experience to a user according to a deformation property of a deformable device.

32 Claims, 15 Drawing Sheets

(51) Int. Cl.
*H04R 29/00* (2006.01)
*H04R 1/40* (2006.01)
*H04R 7/12* (2006.01)
*G06F 3/041* (2006.01)

(52) U.S. Cl.
CPC ........... *H04R 29/002* (2013.01); *G06F 3/041* (2013.01); *G06F 3/165* (2013.01); *G06F 2203/04102* (2013.01); *H04R 2201/025* (2013.01); *H04R 2201/401* (2013.01); *H04R 2430/20* (2013.01); *H04R 2460/07* (2013.01); *H04R 2499/11* (2013.01); *H04R 2499/15* (2013.01); *H04S 2420/01* (2013.01)

(56) References Cited

U.S. PATENT DOCUMENTS

| | | |
|---|---|---|
| 2005/0105748 A1 | 5/2005 | Bartell |
| 2009/0275366 A1 | 11/2009 | Schilling |
| 2010/0064244 A1* | 3/2010 | Kilpatrick, II ........ G06F 1/1616 715/773 |
| 2012/0038570 A1* | 2/2012 | Delaporte ............. G06F 1/1616 345/173 |
| 2012/0306910 A1 | 12/2012 | Kim |
| 2015/0009128 A1 | 1/2015 | Matsumoto |
| 2015/0255023 A1 | 9/2015 | Lee |
| 2016/0026219 A1 | 1/2016 | Kim |
| 2016/0299539 A1* | 10/2016 | Jang ...................... G06F 1/1681 |
| 2016/0330547 A1 | 11/2016 | Du |
| 2016/0330559 A1 | 11/2016 | Du |

FOREIGN PATENT DOCUMENTS

| | | |
|---|---|---|
| CN | 102857592 A | 1/2013 |
| CN | 103702259 A | 4/2014 |
| CN | 103747409 A | 4/2014 |
| CN | 104900152 A | 9/2015 |
| CN | 105302238 A | 2/2016 |
| WO | 02061558 A2 | 8/2002 |

* cited by examiner

INTERACTION METHOD, INTERACTION APPARATUS, AND USER EQUIPMENT

CROSS REFERENCE TO RELATED APPLICATION

The present application is based on and claims the benefit of priority to Chinese Application No. 201610081042.1, filed on Feb. 4, 2016, the entire contents of which are incorporated herein by reference.

TECHNICAL FIELD

The present application relates to the field of interaction technologies, and in particular, to an interaction method, an interaction apparatus, and user equipment.

BACKGROUND

With the development of technologies, deformable devices such as flexible devices become increasingly popular. Deformable devices have changeable shapes, and therefore bring users a lot of new user experience. For example, demands of users for wearable devices to meet different body curves, demands for devices to have increased sizes for using and decreased sizes for carrying, and the like are met more easily. When deformable interaction devices are used to perform interaction, different experience is also brought to users.

SUMMARY

A possible objective of embodiments of the present application is to provide an interaction solution based on a deformable loudspeaker array surface.

According to a first aspect, a possible implementation solution of the present application provides an interaction method, comprising:

determining shape related information of a deformable loudspeaker array surface, where the shape related information corresponds to a first shape of the deformable loudspeaker array surface after a folding deformation;

determining multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape;

using the multiple effective interaction areas as one interaction area at least according to a first relative position of the multiple effective interaction areas in the spatial position in the first shape to provide a sound output interface to at least one interaction object.

According to a second aspect, a possible implementation solution of the present application provides an interaction apparatus, comprising:

an information determining module, configured to determine shape related information of a deformable loudspeaker array surface, where the deformable loudspeaker array surface is at least configured to perform information output, and the shape related information corresponds to a first shape of the deformable loudspeaker array surface after a folding deformation;

an area determining module, configured to determine multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape; and a sound output interface providing module, configured to use the multiple effective interaction areas as one interaction area at least according to a first relative position of the multiple effective interaction areas in the spatial position in the first shape to provide a sound output interface to at least one interaction object.

According to a third aspect, a possible implementation solution of the present application provides user equipment, where the user equipment comprises:

a memory, configured to store a program; and a processor, configured to execute the program stored in the memory, the program causes the processor to execute the following operations:

determining shape related information of a deformable loudspeaker array surface, where the shape related information corresponds to a first shape of the deformable loudspeaker array surface after a folding deformation;

determining multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape; and using the multiple effective interaction areas as one interaction area at least according to a first relative position of the multiple effective interaction areas in the spatial position in the first shape to provide a sound output interface to at least one interaction object.

In at least one implementation solution of the embodiments of the present application, after a deformation of a deformable loudspeaker array surface occurs, multiple effective interaction areas adjacent in the spatial position are recombined to form one new interaction area used to provide a sound output interface to an interaction object, thereby bringing new experience to a user by using a deformation property of a deformable device.

DETAILED DESCRIPTION

Figure 1:
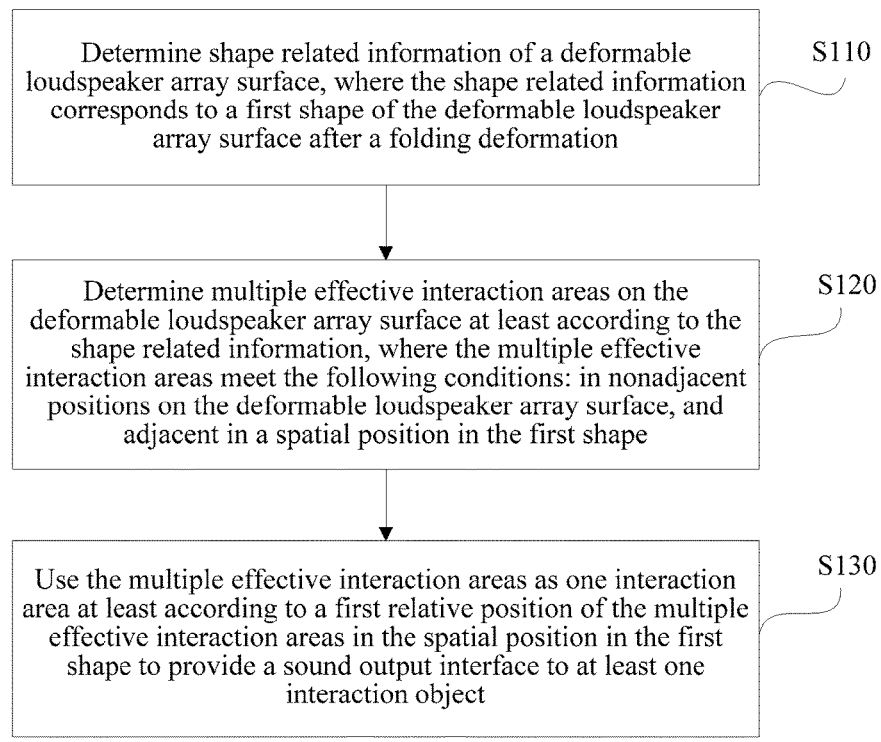
FIG. 1 is a flowchart of an interaction method according to an embodiment of the present application.

The specific implementing manners of the present application are further described below in detail with reference to the accompanying drawings (a same reference numeral in several drawings represents a same element) and embodiments. The embodiments below are used for describing the present application rather than to limit the scope of the present application.

A person skilled in the art may understand that, terms such as "first" and "second" in the present application are only used to distinguish different steps, devices or modules and the like, but do not represent any specific technical meanings, and do not denote a necessary logic order among the steps, devices or modules and the like.

The inventor of the present application finds that, because a deformable loudspeaker array surface has a changeable shape, after a deformation occurs, for some effective interaction areas before the deformation, for example, areas that are covered or blocked after the deformation occurs, effective interaction may no longer be able to be performed after the deformation occurs. Meanwhile, some multiple interaction areas that are originally scattered may become multiple effective interaction areas adjacent in a spatial position after the deformation occurs, and effective use of the multiple effective interaction areas may cause a deformable device to bring more desirable user experience to a user.

In the following description of the present application:

An interaction object of the deformable loudspeaker array surface may be a user, or may be an electronic device and the like.

An effective interaction area is an area where effective interaction may be performed with an interaction object. In a possible implementing manner, for example, it may be set that there is no obstacle within a set distance range on a side faced by the effective interaction area; and/or the effective interaction area faces a side where the interaction object is located, and the like. Alternatively, further, in another possible implementing manner, the effective interaction area comprises that: the interaction meets a set interaction condition, to cause interaction between the effective interaction area and the interaction object to achieve an expected interaction effect. For example, the interaction condition may comprise that: a deviation between the first interaction information before being output by using the effective interaction area and the second interaction information that is output and can be acquired by the interaction object is within a set deviation range.

A position of an interaction area on a deformable loudspeaker array surface is: a position of a coordinate area corresponding to the area on a coordinate surface, where the deformable loudspeaker array surface is used as the coordinate surface. Regardless of how the deformable loudspeaker array surface is curved or folded, a coordinate area corresponding to the area does not change.

A spatial position of an area is a position of the area in a spatial coordinate system.

As shown in FIG. 1, an embodiment of the present application provides an interaction method, comprising:

S110: Determine shape related information of a deformable loudspeaker array surface, where the shape related information corresponds to a first shape of the deformable loudspeaker array surface after a folding deformation.

S120: Determine multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape.

S130: Use the multiple effective interaction areas as one interaction area at least according to a first relative position of the multiple effective interaction areas in the spatial position in the first shape to provide a sound output interface to at least one interaction object.

Figure 4A:
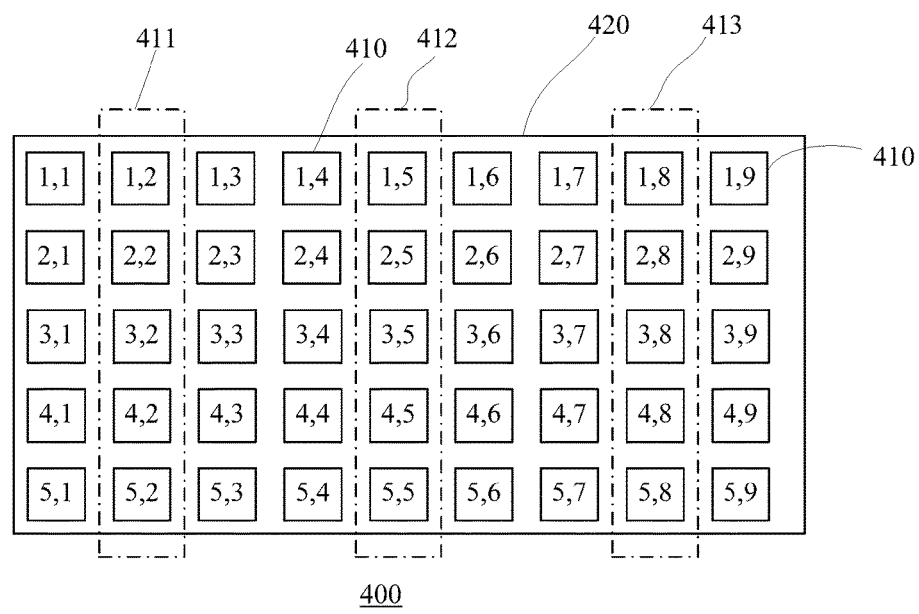
FIG. 4a to FIG. 4c are schematic diagrams of an application scenario of an interaction method according to an embodiment of the present application.

In a possible implementing manner, the deformable loudspeaker array surface, for example, may comprise: a flexible substrate surface and multiple loudspeaker units distributed in an array on the flexible substrate surface, for example, the loudspeaker array shown in FIG. 4a. In a possible implementing manner, the flexible substrate surface may be a flexible display screen or flexible display touch screen, and the loudspeaker unit is a transparent loudspeaker unit.

In another possible implementing manner, the deformable loudspeaker array surface, for example, may further be a flexible film loudspeaker array surface.

For example, the interaction apparatus provided in the present application is used as an execution subject in this embodiment to execute S110 to S130. Specifically, the interaction apparatus may be disposed in user equipment in a manner of software, hardware or a combination of software and hardware, or, the interaction apparatus may be the user equipment. The user equipment comprises but not limited to a mobile phone, a computer, a television, a wearable device or the like that has a deformable loudspeaker array surface that allows a folding deformation.

In an implementing manner in this embodiment of the present application after a deformation of a deformable loudspeaker array surface occurs, multiple effective interaction areas adjacent in the spatial position are recombined to form one new interaction area used to provide a sound output interface to an interaction object, thereby bringing new experience to a user by using a deformation property of a deformable device.

The method in this embodiment of the present application is further described by using the following implementing manners.

Figure 2A:
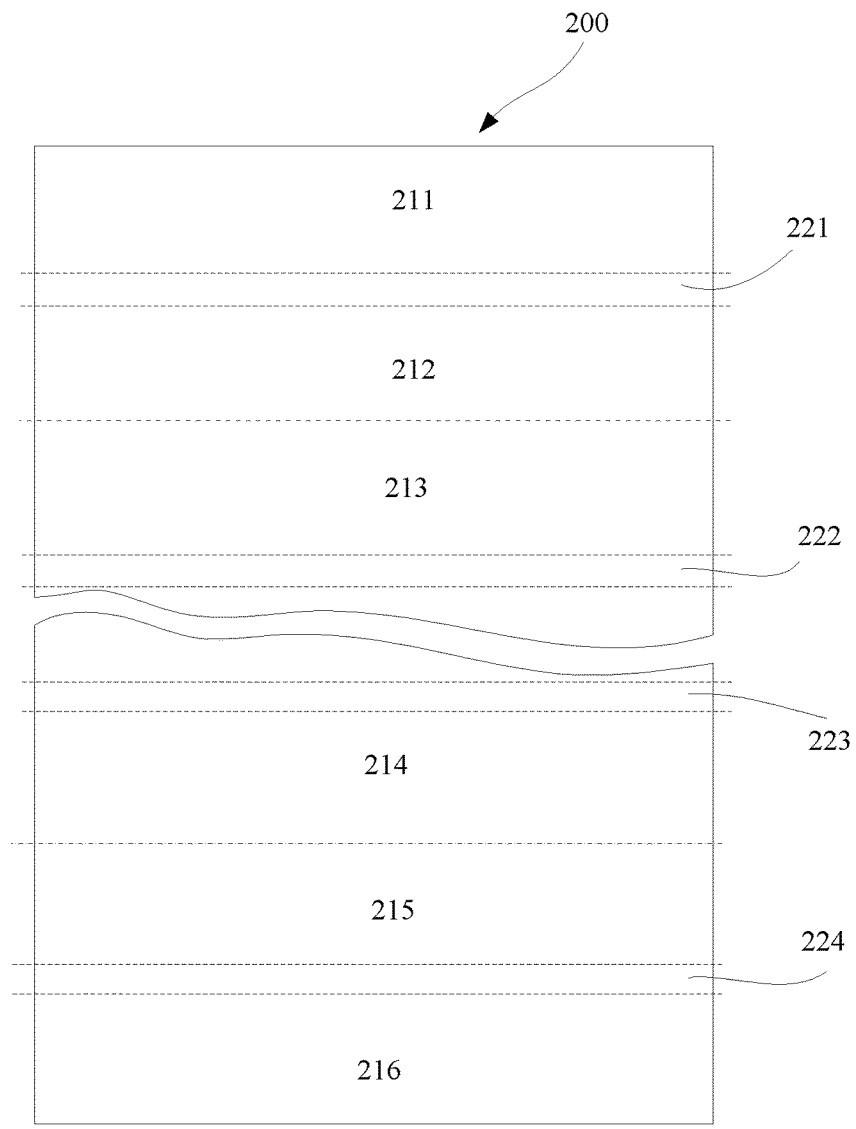
FIG. 2a to FIG. 2e are schematic diagrams of an application scenario of an interaction method according to an embodiment of the present application.
Figure 2B:
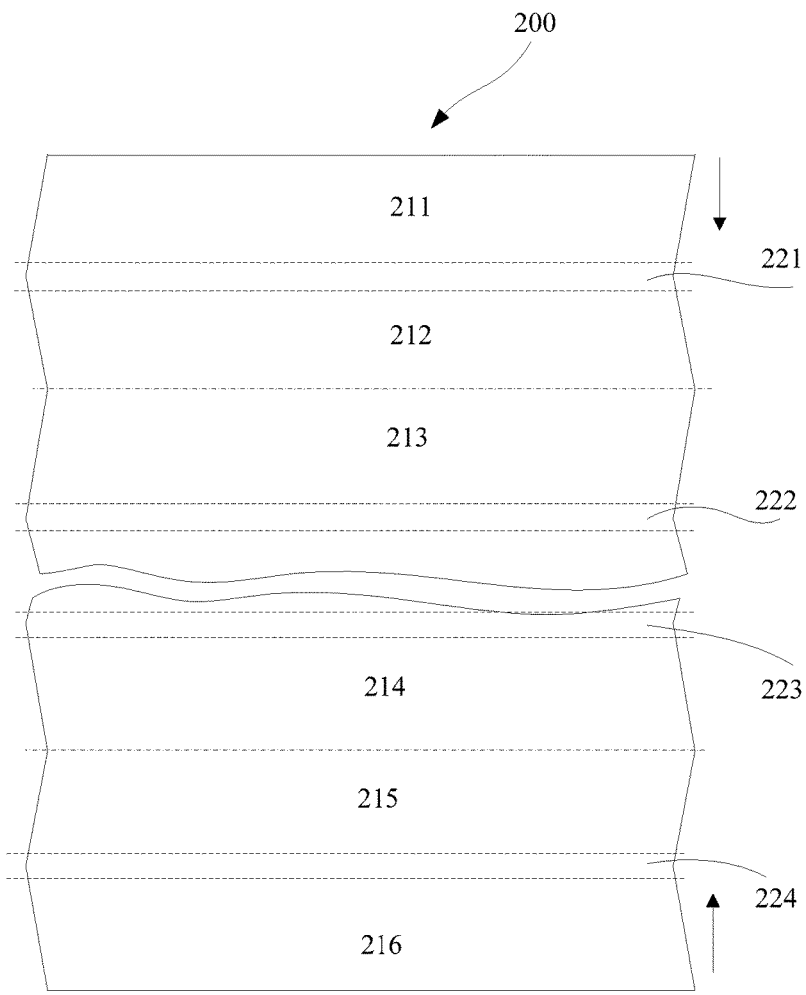

In a possible implementing manner, a shape of a deformable loudspeaker array surface 200 being unfolded is a rectangle shown in FIG. 2a. During a folding deformation, the rectangle shown in FIG. 2a turns into a wavy state shown in FIG. 2b and eventually becomes a folded state shown in FIG. 2c. FIG. 2d is a right diagram of FIG. 2c.

As can be seen from FIG. 2a to FIG. 2d, after a folding deformation of a deformable loudspeaker array surface 200 occurs, a part of the interaction area (for example, wing-surface areas 212 to 215) is folded and blocked and is no longer an effective interaction area. In some possible implementing manners, another part of interaction area (for example, wing-surface areas 211 and 216) may also be no longer an effective interaction area because of a facing-direction problem (for example, an interaction direction D of an interaction object to the deformable loudspeaker array surface 200 is a direction right opposite the deformable loudspeaker array surface 200 shown in FIG. 2a to FIG. 2c).

In the implementing manner shown in FIG. 2a to FIG. 2d, only several remaining folding areas 221 to 225 where several outwardly-bending end surfaces are located are effective interaction areas that still can be used to perform effective interaction with an interaction object.

In this embodiment of the present application, a folding area is an area corresponding to a bending end that connects two opposite wing surfaces in a creased structure. For example, a folding area 221 is an area corresponding to a bending end that connects two opposite wing surface areas 211 and 212 after folding.

Conventionally, after the foregoing folding deformation is performed on the deformable loudspeaker array surface 200, for remaining effective interaction areas, a possible manner is: an interaction function of the entire deformable loudspeaker array surface 200 is turned off, and interaction is no longer performed with the interaction object. For example, all loudspeaker units are turned off and no longer produce a sound. Another possible manner is: The remaining effective interaction areas are still used as a part of the sound output interface before the deformation to perform incomplete interaction with the interaction object. For example, each loudspeaker unit performs sound output by using corresponding sound data before the deformation (however, a presentation effect of sound is changed).

The inventor of the present application finds that, in some scenarios, after the folding deformation of the deformable loudspeaker array surface occurs, multiple effective interaction areas adjacent in a spatial position may be formed. Although an area of one effective interaction area may be relatively small and can hardly be used as a separate sound output interface to perform interaction with an interaction object, the multiple effective interaction areas may be recombined into one relatively large interaction area and may be reused.

In this embodiment of the present application, shape related information corresponding to the first shape of the deformable loudspeaker array surface after a folding deformation is determined, and the multiple effective interaction areas are then determined according to the shape related information.

In a possible implementing manner, optionally, the shape related information may comprise:

the first shape information of the first shape.

Figure 2C:
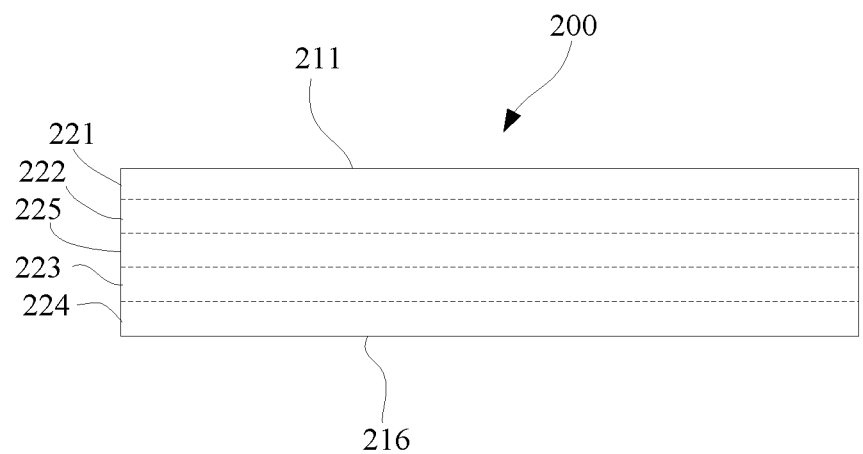
Figure 2D:
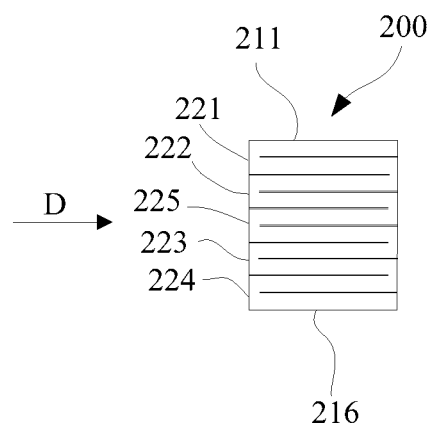

For example, in the implementing manner shown in FIG. 2a to FIG. 2d, shape information of the deformable loudspeaker array surface after the folding shown in FIG. 2c and FIG. 2d may be acquired as the shape related information.

In another possible implementing manner, optionally, the shape related information may also be not the first shape information, and instead may indirectly obtain other information of the first shape information. For example, the shape related information may comprise:

second shape information of a second shape of the deformable loudspeaker array surface before the folding deformation, and deformation information corresponding to the folding deformation.

Here, the deformation information may be a shape change parameter, or may be another parameter related to a deformation. For example, when the deformable loudspeaker array surface is a thermally-induced deformation material, the deformation information may comprise temperature change information and the like of areas. Alternatively, for example, the deformation information may further be displacement information, of areas on the deformable loudspeaker array surface, acquired by using an acceleration sensing array, a gyroscope array, and the like corresponding to the deformable loudspeaker array surface.

A person skilled in the art may know that the first shape may also be determined according to the second shape information and the deformation information.

In a possible implementing manner, the deformable loudspeaker array surface has a controllable deformation, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in S110, the shape related information may be determined at least according to a deformation control instruction, where the deformation control instruction is used to control the folding deformation of the deformable loudspeaker array surface.

For example, in the implementing manner as shown in FIG. 2a to FIG. 2d, a first deformation control instruction may be obtained in response to an operation that a user clicks a "Fold" button. The first deformation control instruction corresponds to the shape shown in FIG. 2c. In this case, regardless of a shape of the deformable loudspeaker array surface before a folding deformation, once the first deformation control instruction is acquired, the deformable loudspeaker array surface is automatically controlled to deform into the shape shown in FIG. 2c.

In other possible implementing manners, for example, when the deformation control instruction corresponds to deformation information, in S110, the second shape information further requires to be acquired to obtain the shape related information.

In addition to the foregoing the deformation control instruction, a deformation sensor configured to acquire corresponding deformation sensing information according to a deformation of the deformable loudspeaker array surface may be further used to obtain the deformation related information. The deformation sensor, for example, may generate a corresponding voltage or current parameter value according to a deformation of the deformable loudspeaker array surface, where the deformation sensing information is the voltage or current parameter value.

In a possible implementing manner, after the folding deformation of the deformable loudspeaker array surface occurs, the shape related information may be determined at least according to the deformation sensing information.

In the method in this embodiment of the present application, after the shape related information is acquired, the multiple effective interaction areas may be determined at least according to the shape related information.

In this embodiment of the present application, the multiple effective interaction areas meet the following conditions: in nonadjacent positions on the deformable loudspeaker array surface, and adjacent in a spatial position in the first shape.

Here, the multiple effective interaction areas are adjacent in a spatial position in the first shape, and therefore can be recombined into one interaction area.

In this embodiment of the present application, if two effective interaction areas are in adjacent positions on the deformable loudspeaker array surface and are adjacent in the spatial position in the first shape, the two effective interaction areas may be seen as one effective interaction area.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0. For example, in the implementing manner shown in FIG. 2c and FIG. 2d, two adjacent effective interaction areas adjoin.

Figure 2E:
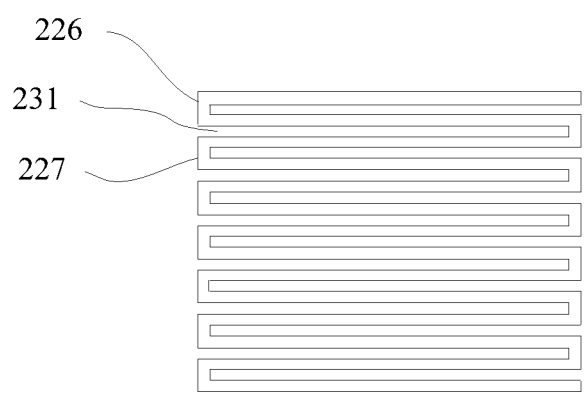

Alternatively, in another possible implementing manner, that two effective interaction areas are adjacent in a spatial position may be that a distance between nearby edges of the two interaction areas is less than a set value. For example, the deformable loudspeaker array surface shown in FIG. 2a may also be folded and deformed into the shape shown in FIG. 2e. A gap area 231 further exists between the two adjacent effective interaction areas 226, 227. In this implementing manner, when a width (a width in a vertical direction in FIG. 2e) of the gap area 231 is less than set value, it may be considered that the two effective interaction areas 226, 227 are adjacent.

In some possible implementing manners, the set value may be determined according to influence of the distance on interaction of the interaction object. For example, when the distance between two adjacent effective interaction areas is so large that another interaction area between the two effective interaction areas can also be used to perform effective interaction with the interaction object, the distance between the two effective interaction areas is greater than the set value.

In a possible implementing manner, in addition to the shape related information, other information may further need to be combined to obtain the multiple effective interaction areas.

For example, in a possible implementing manner, because interaction between the deformable loudspeaker array surface and the interaction object is directional, in this case, to provide a more desirable use effect for a user, the multiple effective interaction areas may be determined according to the shape related information and a second relative position of the interaction object relative to the deformable loudspeaker array surface in the first shape. Further description is recorded in the following implementing manner.

For example, in a possible implementing manner, S120 may comprise:

determining, according to the shape related information, multiple folding areas where multiple outwardly-bending end surfaces are located, where the multiple outwardly-bending end surfaces are adjacent in the spatial position on the deformable loudspeaker array surface in the first shape; and determining the multiple effective interaction areas at least according to the multiple folding areas.

In a possible implementing manner, the multiple effective interaction areas are the multiple folding areas.

As shown in FIG. 2a and FIG. 2c, positions of each two of the multiple folding areas 221 to 225 on the deformable loudspeaker array surface are separated by at least another interaction area and are not adjacent to each other. In a deformed spatial position, the multiple folding areas 221 to 225 are adjacent. Therefore, in the implementing manner shown in FIG. 2a to FIG. 2d, it may be determined that the multiple folding areas 221 to 225 are the multiple effective interaction areas.

In some possible implementing manners, in addition to the foregoing the multiple folding areas, the multiple effective interaction areas may further comprise another area that is adjacent to or is connected to the multiple folding areas in the spatial position after the folding deformation occurs.

For example, in a possible implementing manner, as shown in FIG. 2a to FIG. 2d, the folding area 221 and the wing-surface area 211 that are connected may be used as one effective interaction area; and the folding area 224 and the wing-surface area 216 that are connected may be used as one effective interaction area.

Figure 3A:
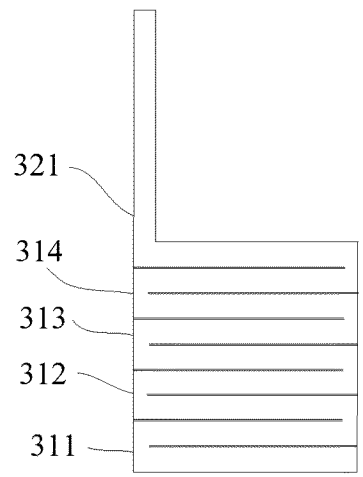
FIG. 3a and FIG. 3b are schematic diagrams of two shapes of a deformable loudspeaker array surface after being folded in an interaction method according to an embodiment of the present application.

Further, for example, in the implementing manner shown in FIG. 3a, in a case in which an interaction direction is considered, in addition to four folding areas 311 to 314, an unfolded area 321 (an area where a wing surface is located in a creased structure) is also an effective interaction area facing the interaction object, and is adjacent to the four folding areas 311 to 314 in the spatial position. Therefore, the multiple effective interaction areas further comprise the unfolded area 321.

Therefore, the determining the multiple effective interaction areas at least according to the multiple folding areas comprises:

determining the multiple effective interaction areas at least according to the multiple folding areas and the first shape.

In some possible implementing manners, the determining the multiple effective interaction areas at least according to the multiple folding areas may comprise:

determining the multiple effective interaction areas at least according to the multiple folding areas, the first shape, and a second relative position of an interaction object relative to the deformable loudspeaker array surface after the folding deformation.

In some possible implementing manners, the second relative position may be real position information acquired in real time. In other possible implementing manners, the second relative position may be set by default, for example, is a common second relative position obtained according to use habits of multiple users, or is a second relative position obtained according to a setting by a user.

Figure 3B:
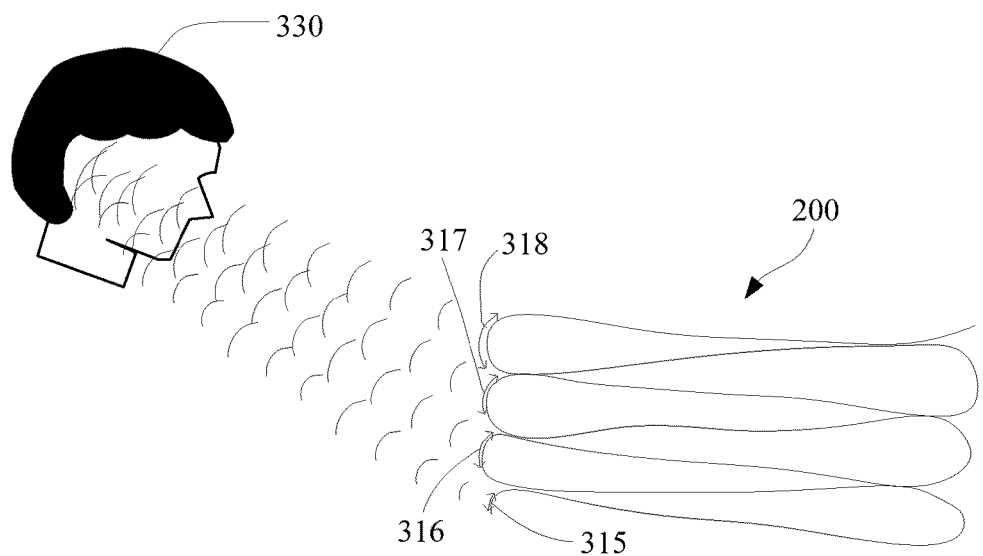

For example, in a possible implementing manner, a shape of the deformable loudspeaker array surface 200 shown in FIG. 2a after a folding deformation may also be a shape shown in FIG. 3b. In this implementing manner, and the interaction object is a user 330.

As can be seen in FIG. 3b, in this implementing manner, although the multiple folding areas after the folding deformation are not blocked by other areas on the deformable loudspeaker array surface, in a case in which a second relative position of a user relative to the deformable loudspeaker array surface is unchanged, because sound propagation is directional, sound produced in some areas on the folding area cannot desirably reach a position of the user (for example, the sound cannot reach the position of the user or an effect of sound that reaches the position of the user is relatively poor, and the like). Therefore, in this implementing manner, in consideration of use convenience for the user, optionally, the multiple effective interaction areas may be further determined by combining the first shape and the second relative position.

Therefore, in this implementing manner, multiple folding areas on a side facing the user may be first determined according to the shape related information, and multiple effective viewing areas 315 to 318, where sound information can be effectively propagated to the position of the user, in the multiple folding areas are then determined according to the first shape and the second relative position.

In this implementing manner, the second relative position may be determined by using an interaction object position sensor on a side of the deformable loudspeaker array surface, or by means of communication with another device on a side of the interaction object.

In this embodiment of the present application, after the multiple effective interaction areas are determined, the multiple effective interaction areas may be used as one new interaction area to provide a sound output interface to an interaction object.

In a possible implementing manner, the using the multiple effective interaction areas as one interaction area at least according to a first relative position may be: splicing the multiple effective interaction areas to the interaction area according to the first relative position.

In a possible implementing manner, the deformable loudspeaker array surface implements interaction with an interaction object by using multiple comprised interaction units, and each effective interaction area corresponds to multiple interaction units. Here, an interaction unit may be a loudspeaker unit that can independently produce sound.

In a possible implementing manner, the splicing may be performing readdressing on addresses of interaction units in the multiple effective interaction areas, to obtain a new address that matches the interaction area.

For example, it is assumed that in the implementing manner shown in FIG. 2a, before the folding deformation, first addresses (x,y) of interaction units comprised in the folding area 221 and the folding area 222 (where x is a first row address, y is a first column address, and in a possible implementing manner, the first address may also be used as coordinates of a position of an interaction unit on the deformable loudspeaker array surface) are shown in Table 1 and Table 2:

TABLE 1

First addresses of 30 interaction units comprised in the folding area 221

| 13, 1 | 13, 2 | 13, 3 | 13, 4 | 13, 5 | 13, 6 | 13, 7 | 13, 8 | 13, 9 | 13, 10 |
|---|---|---|---|---|---|---|---|---|---|
| 14, 1 | 14, 2 | 14, 3 | 14, 4 | 14, 5 | 14, 6 | 14, 7 | 14, 8 | 14, 9 | 14, 10 |
| 15, 1 | 15, 2 | 15, 3 | 15, 4 | 15, 5 | 15, 6 | 15, 7 | 15, 8 | 15, 9 | 15, 10 |

TABLE 2

First addresses of 30 interaction units comprised in the folding area 222

| 40, 1 | 40, 2 | 40, 3 | 40, 4 | 40, 5 | 40, 6 | 40, 7 | 40, 8 | 40, 9 | 40, 10 |
|---|---|---|---|---|---|---|---|---|---|
| 41, 1 | 41, 2 | 41, 3 | 41, 4 | 41, 5 | 41, 6 | 41, 7 | 41, 8 | 41, 9 | 41, 10 |
| 42, 1 | 42, 2 | 42, 3 | 42, 4 | 42, 5 | 42, 6 | 42, 7 | 42, 8 | 42, 9 | 42, 10 |

In this implementing manner, if readdressing is performed on addresses of the interaction units in the two folding areas 221, 222 according to relative positions in space of the two folding areas 221, 222 in the first shape after the folding deformation shown in FIG. 2c, second addresses (x1,y1) of the interaction units as shown in Table 3 and Table 4 may be obtained:

TABLE 3

Second addresses of the 30 interaction units comprised in the folding area 221

| 1, 1 | 1, 2 | 1, 3 | 1, 4 | 1, 5 | 1, 6 | 1, 7 | 1, 8 | 1, 9 | 1, 10 |
|---|---|---|---|---|---|---|---|---|---|
| 2, 1 | 2, 2 | 2, 3 | 2, 4 | 2, 5 | 2, 6 | 2, 7 | 2, 8 | 2, 9 | 2, 10 |
| 3, 1 | 3, 2 | 3, 3 | 3, 4 | 3, 5 | 3, 6 | 3, 7 | 3, 8 | 3, 9 | 3, 10 |

TABLE 4

Second addresses of the 30 interaction units comprised in the folding area 222

| 4, 1 | 4, 2 | 4, 3 | 4, 4 | 4, 5 | 4, 6 | 4, 7 | 4, 8 | 4, 9 | 4, 10 |
|---|---|---|---|---|---|---|---|---|---|
| 5, 1 | 5, 2 | 5, 3 | 5, 4 | 5, 5 | 5, 6 | 5, 7 | 5, 8 | 5, 9 | 5, 10 |
| 6, 1 | 6, 2 | 6, 3 | 6, 4 | 6, 5 | 6, 6 | 6, 7 | 6, 8 | 6, 9 | 6, 10 |

It may be seen that, after readdressing is performed on the addresses of the interaction units in the two folding areas 221, 222, second addresses of multiple interaction units respectively comprised in the two adjacent folding areas 221, 222 after the folding deformation are also adjacent and consecutive.

In another possible implementing manner, in the splicing, readdressing may also be not performed on the addresses of the interaction units in the multiple effective interaction areas, that is, the addresses of the interaction units are kept unchanged, but correlations between the addresses are changed.

For example, in a scenario in which the interaction units are scanned during interaction with an interaction object, the first address (15,10) of the last interaction unit of the folding area 221 and the first address (40,1) of the first interaction unit of the folding area 222 are correlated, to cause that during interaction of interaction information with an interaction object, after the last interaction unit of the folding area 221 is scanned, the first interaction unit of the folding area 222 is scanned next, and another area between the two folding areas 221, 222 is no longer scanned.

In still another possible implementing manner, the splicing may also be virtual splicing, and the interaction area is a virtual interaction area, that is, according to the first relative position, the multiple effective interaction areas are virtually spliced and mapped onto the virtual interaction area.

In a possible implementing manner, after the interaction area is determined through splicing, S130 may further comprise:

determining sound information matching the interaction area; and mapping the sound information from the interaction area to multiple loudspeaker units of the multiple effective interaction areas according to the first relative position.

In a possible implementing manner, at least according to sound output property information of the interaction area, sound information matching the sound output property information is determined.

In a possible implementing manner, the sound output property information may comprise:

shape information of the interaction area, for example, a size and an outer shape (for example, a rectangle and a circle) of the interaction area.

In another possible implementing manner, the sound output property information may further comprise:

a distribution property of a loudspeaker array corresponding to the interaction area, where the distribution property, for example, may comprise at least one of the following: a quantity, distribution positions, a distribution density, and the like of loudspeaker units.

In still another possible implementing manner, optionally, the sound output property may further comprise:

a loudspeaker property of loudspeaker units in the loudspeaker array, where the loudspeaker property, for example, may comprise: a power property, a frequency response property, and the like.

In a possible implementing manner, the sound output property comprises multiple of the foregoing.

In a possible implementing manner, the mapping the sound information from the interaction area to the multiple effective interaction areas according to the first relative position comprises:

processing the sound information according to the first relative position, to obtain multiple pieces of sound sub-information respectively corresponding to the multiple loudspeaker units.

For example, in a possible implementing manner, sound sub-information that needs to be output by the loudspeaker units of the loudspeaker array may be determined according to the shape information of the interaction area, the distribution property of the loudspeaker array, and the loudspeaker property of the loudspeaker units (here, it may be regarded that a loudspeaker unit that does not need to produce a sound in the interaction area corresponds to sound sub-information of zero output; for example, a vibration amplitude is 0), so as to achieve an expected sound restoration effect. Here, for example, a sound effect positioning algorithm such as a head-response transfer function (HRTF) may be used to determine the sound sub-information.

In a possible implementing manner, according to a beforehand setting, the sound information may be further related to, in addition to the sound output property information, original sound information of the deformable loudspeaker array surface before the folding deformation. For example, in a possible implementing manner, a sound effect corresponding to the sound information is determined according to an original sound effect corresponding to the original sound information. For example, it is met that a difference between the sound effect and the original sound effect is minimum or the difference is within a set value. Alternatively, in a possible implementing manner, it is met that the sound information and the original sound information comprise the same information (for example, semantic content) that needs to be transferred to the interaction object, and in this case, sound effects may be different.

Therefore, in a possible implementing manner, the determining sound information matching the interaction area comprises:

determining the sound information at least according to original sound information corresponding to the deformable loudspeaker array surface before the folding deformation and the sound output property information.

A person skilled in the art may know that a manner of determining sound information matching the interaction area may further be another manner, and the manners are no longer listed one by one herein.

In a possible implementing manner, optionally, S130 may further comprise: presenting the multiple pieces of sound sub-information by using the multiple loudspeaker units respectively.

FIG. 4a shows a distribution of multiple loudspeaker units 410 of the loudspeaker array 400 on a flexible substrate 420, where the multiple loudspeaker units 410 are in a 5*9 array.

Figure 4B:
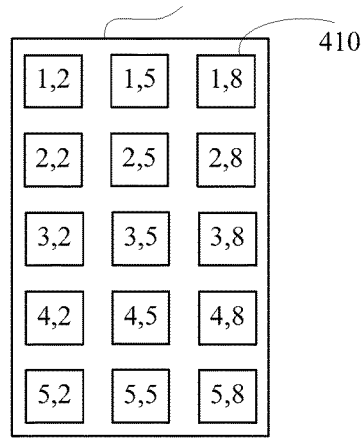

After a folding deformation, for example, areas covered by the first, the third, the fourth, the sixth, the seventh, and the ninth columns of loudspeaker units are covered or face different directions, and therefore the areas of the six columns of loudspeaker units are no longer effective interaction areas. In this implementing manner, during sound output, the six columns of loudspeaker units may not need to be driven, so as to prohibit the six columns of loudspeaker units from producing a sound, thereby avoiding interference and reducing power consumption. Areas where the second, the fifth, and the eighth columns of loudspeaker units are located are three folding areas 411 to 413 of the folding deformed shape, so as to form three effective interaction areas after the folding deformation. Positions and a distribution of loudspeaker units 410 on the three effective interaction areas after the folding deformation are shown in FIG. 4b. It may be seen that, positions of the three effective interaction areas are not adjacent on the loudspeaker array 400, and are adjacent in a spatial position after a current time of folding deformation, so as to form a new interaction area 430.

Figure 4C:
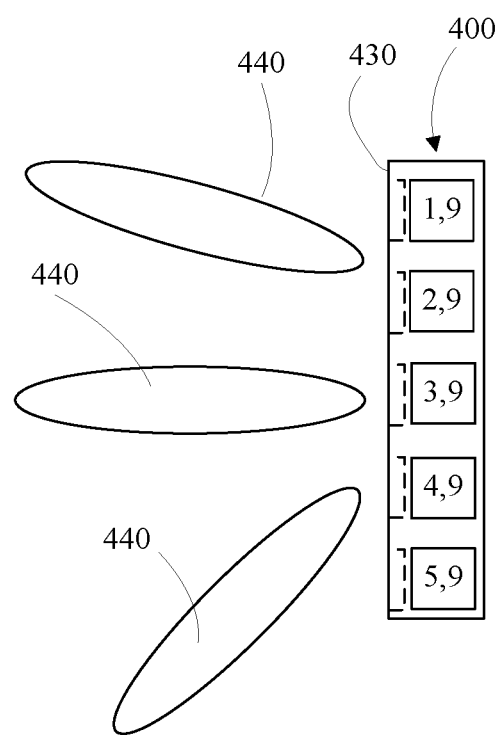

As shown in FIG. 4c, after sound information corresponding to the interaction area 430 is determined, the second, the fifth, and the eighth columns of multiple loudspeaker units 410 on the interaction area 430 are driven (for example, driven by using multiple weight factors), to cause the sound information to be presented to the user.

A person skilled in the art may understand that, in the foregoing method of specific implementing manners of the present application, sequence numbers of steps do not mean an order of executing the steps, where the order of executing the steps should be determined by the functions and internal logic of the steps, and should not constitute any limitation on implementation processes of the specific implementing manners of the present application.

Figure 5:
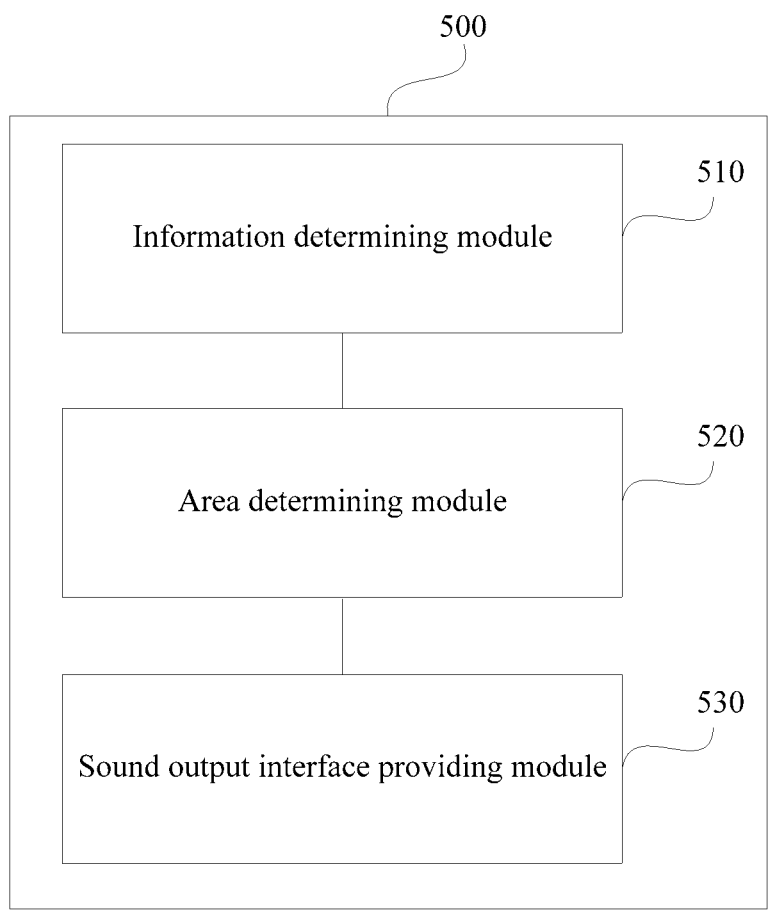
FIG. 5 is a schematic structural block diagram of an interaction apparatus according to an embodiment of the present application.

As shown in FIG. 5, a possible implementing manner of an embodiment of the present application provides an interaction apparatus 500, comprising:

an information determining module 510, configured to determine shape related information of a deformable loudspeaker array surface, where the shape related information corresponds to a first shape of the deformable loudspeaker array surface after a folding deformation;

an area determining module 520, configured to determine multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape; and a sound output interface providing module 530, configured to use the multiple effective interaction areas as one interaction area at least according to a first relative position of the multiple effective interaction areas in the spatial position in the first shape to provide a sound output interface to at least one interaction object.

In a possible implementing manner, the deformable loudspeaker array surface, for example, may comprise: a flexible substrate surface and multiple loudspeaker units distributed in an array on the flexible substrate surface, for example, the loudspeaker array shown in FIG. 4a. In a possible implementing manner, the flexible substrate surface may be a flexible display screen or flexible display touch screen, and the loudspeaker unit is a transparent loudspeaker unit.

In another possible implementing manner, the deformable loudspeaker array surface, for example, may further be a flexible film loudspeaker array surface.

In an implementing manner in this embodiment of the present application after a deformation of a deformable loudspeaker array surface occurs, multiple effective interaction areas adjacent in the spatial position are recombined to form one new interaction area used to provide a sound output interface to an interaction object, thereby bringing new experience to a user by using a deformation property of a deformable device.

The modules and units in this embodiment of the present application are further described by using the following implementing manners.

In a possible implementing manner, optionally, the shape related information may comprise:

the first shape information of the first shape.

In another possible implementing manner, optionally, the shape related information may also be not the first shape information, and instead may indirectly obtain other information of the first shape information. For example, the shape related information comprises:

second shape information of a second shape of the deformable loudspeaker array surface before the folding deformation, and deformation information corresponding to the folding deformation.

Here, the deformation information may be a shape change parameter, or may be another parameter related to a deformation. For example, when the deformable loudspeaker array surface is a thermally-induced deformation material, the deformation information may comprise temperature change information and the like of areas. Alternatively, for example, the deformation information may further be displacement information, of areas on the deformable loudspeaker array surface, acquired by using an acceleration sensing array, a gyroscope array, and the like corresponding to the deformable loudspeaker array surface.

A person skilled in the art may know that the first shape may also be determined according to the second shape information and the deformation information.

Figure 6A:
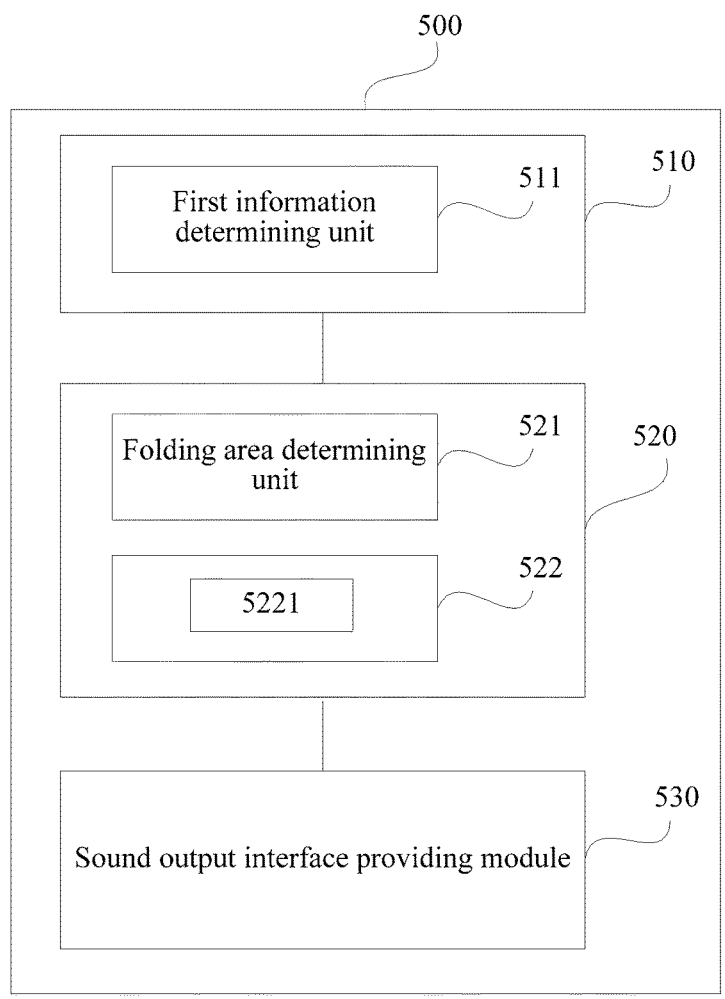
FIG. 6a to FIG. 6f are schematic structural block diagrams of six interaction apparatus according to an embodiment of the present application.

In a possible implementing manner, the deformable loudspeaker array surface is an interaction surface whose deformation is controllable, and is configured to perform different deformations according to different deformation control instructions. The deformation control instruction may be generated in response to an interaction object interaction operation. In a possible implementing manner, according to a beforehand setting, each deformation control instruction may correspond to shape information after a deformation; or may correspond to a piece of deformation information. Therefore, in a possible implementing manner, as shown in FIG. 6a, the information determining module 510 comprises:

a first information determining unit 511, configured to determine the shape related information at least according to a deformation control instruction, where the deformation control instruction is used to control the folding deformation of the deformable loudspeaker array surface.

In a possible implementing manner, the first information determining unit 511 may, for example, acquire a correspondence between at least one deformation control instruction and at least one piece of deformation related information from a storage module according to the deformation control instruction, where the storage module stores the correspondence, and then obtain deformation related information corresponding to the deformation control instruction.

Figure 6B:
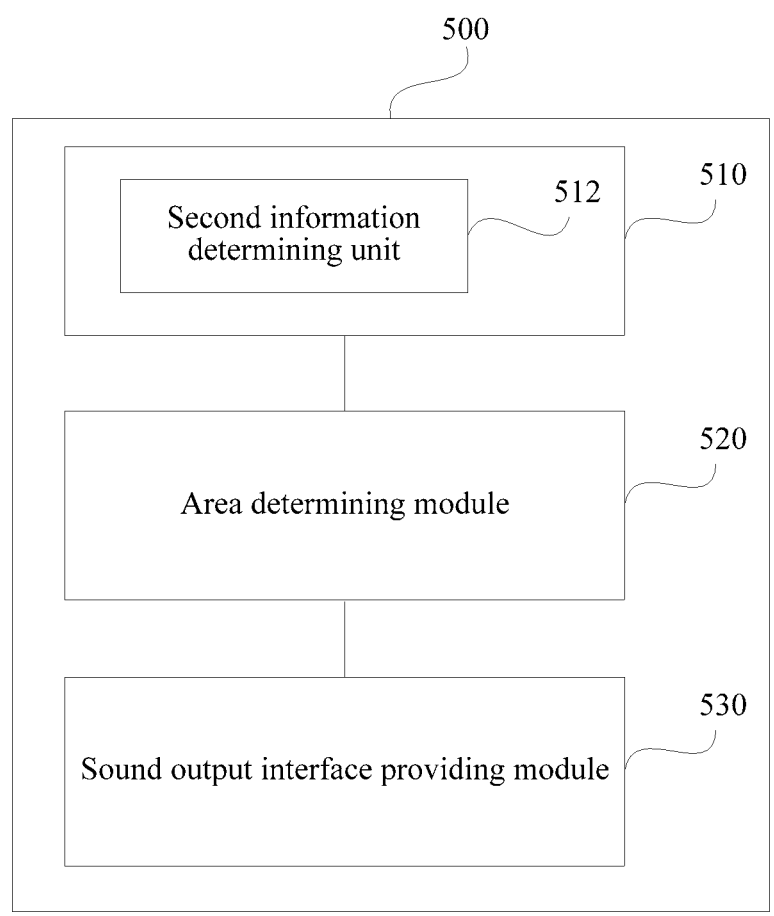

In addition to the foregoing the deformation control instruction, a deformation sensor configured to acquire corresponding deformation sensing information according to a deformation of the deformable loudspeaker array surface may be further used to obtain the deformation related information. The deformation sensor, for example, may generate a corresponding voltage or current parameter value according to a deformation of the deformable loudspeaker array surface, where the deformation sensing information is the voltage or current parameter value. Therefore, in a possible implementing manner, as shown in FIG. 6b, the information determining module 510 may comprise:

a second information determining unit 512, configured to determine the shape related information at least according to deformation sensing information for the deformable loudspeaker array surface.

In a possible implementing manner, that the multiple effective interaction areas are adjacent in the spatial position comprises:

for a first effective interaction area of the multiple effective interaction areas, at least another effective interaction area that is adjacent in the spatial position to the first effective interaction area exists, where the first effective interaction area is any effective interaction area of the multiple effective interaction areas.

In a possible implementing manner, that two effective interaction areas are adjacent in a spatial position may be that a distance between nearby edges of the two effective interaction areas is approximately 0.

Alternatively, in another possible implementing manner, that two effective interaction areas are adjacent in a spatial position may be that a distance between nearby edges of the two interaction areas is less than a set value.

In some possible implementing manners, the set value may be determined according to influence of the distance on interaction of the interaction object. For example, when the distance between two adjacent effective interaction areas is so large that another interaction area between the two effective interaction areas may also be used to perform effective interaction with the interaction object, the distance between the two effective interaction areas is greater than the set value.

In a possible implementing manner, in addition to the shape related information, other information may further need to be combined to obtain the multiple effective interaction areas.

For example, in a possible implementing manner, because interaction between the deformable loudspeaker array surface and the interaction object is directional, in this case, to make use of a user more convenient, the area determining module 520 is further configured to:

determine the multiple effective interaction areas on the deformable loudspeaker array surface according to the shape related information and a second relative position of an interaction object relative to the deformable loudspeaker array surface after the folding deformation. For details, reference is made to the description corresponding to the embodiment shown in FIG. 3b.

In a possible implementing manner, as shown in FIG. 6a, the area determining module 520 comprises:

a folding area determining unit 521, configured to determine, according to the shape related information, multiple folding areas where multiple outwardly-bending end surfaces are located, where the multiple outwardly-bending end surfaces are adjacent in the spatial position on the deformable loudspeaker array surface in the first shape; and an area determining unit 522, configured to determine the multiple effective interaction areas at least according to the multiple folding areas.

In a possible implementing manner, the multiple effective interaction areas are the multiple folding areas. Therefore, in this implementing manner, as shown in FIG. 6a, the area determining unit 522 comprises:

a first determining subunit 5221, configured to determine that the multiple folding areas are the multiple effective interaction areas.

Figure 6C:
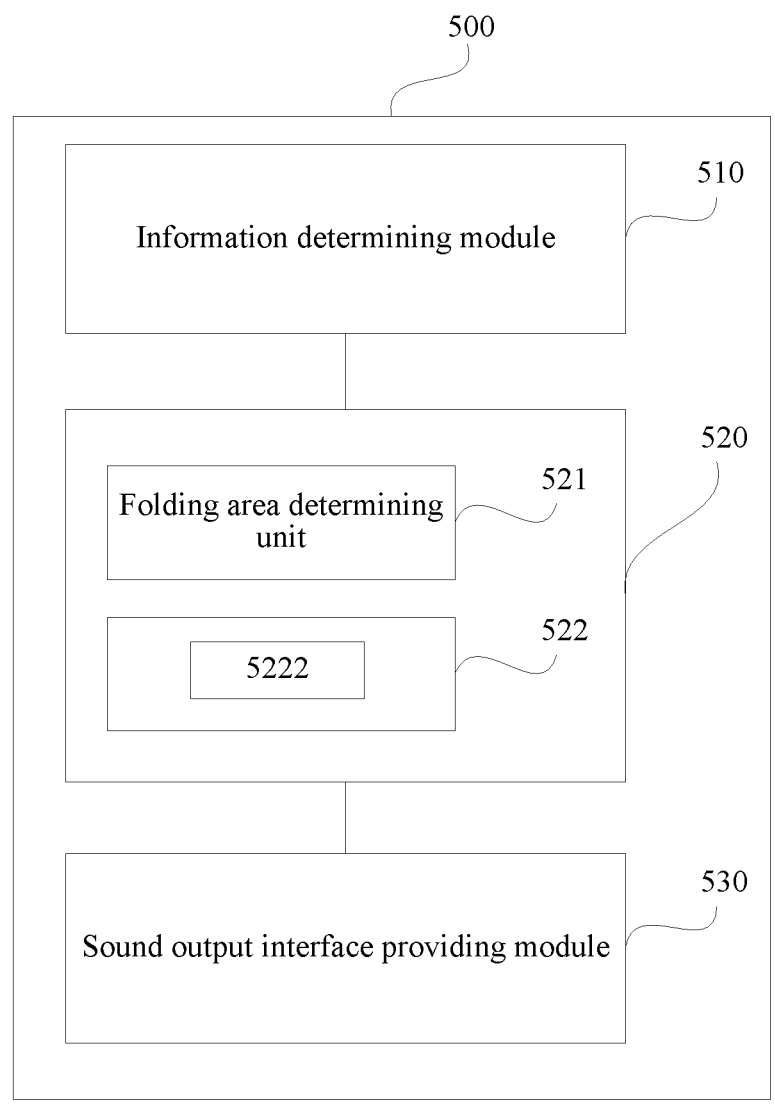

In some possible implementing manners, in addition to the foregoing the multiple folding areas, the multiple effective interaction areas may further comprise another area that is adjacent to or is connected to the multiple folding areas in the spatial position after the folding deformation occurs. Therefore, in this implementing manner, as shown in FIG. 6c, the area determining unit 522 comprises:

a second determining subunit 5222, configured to determine the multiple effective interaction areas at least according to the multiple folding areas and the first shape.

Figure 6D:
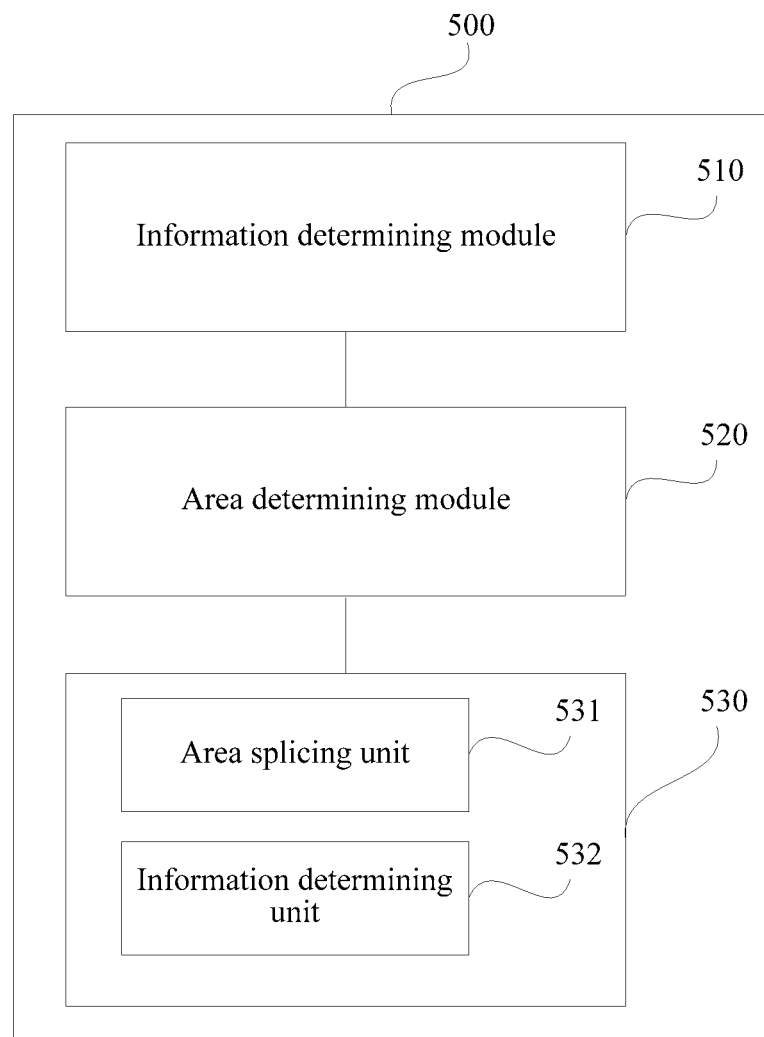

In a possible implementing manner, as shown in FIG. 6d, optionally, the sound output interface providing module 530 may comprise:

an area splicing unit 531, configured to perform splicing on the multiple effective interaction areas according to the first relative position to form the interaction area. For a specific splicing manner, reference is made to the corresponding description in the foregoing method embodiments.

In a possible implementing manner, as shown in FIG. 6d, optionally, the sound output interface providing module 530 may further comprise:

an information determining unit 532, configured to determine sound information matching the interaction area; and an information mapping unit 533, configured to map the sound information from the interaction area to multiple loudspeaker units of the multiple effective interaction areas at least according to the first relative position.

Figure 6E:
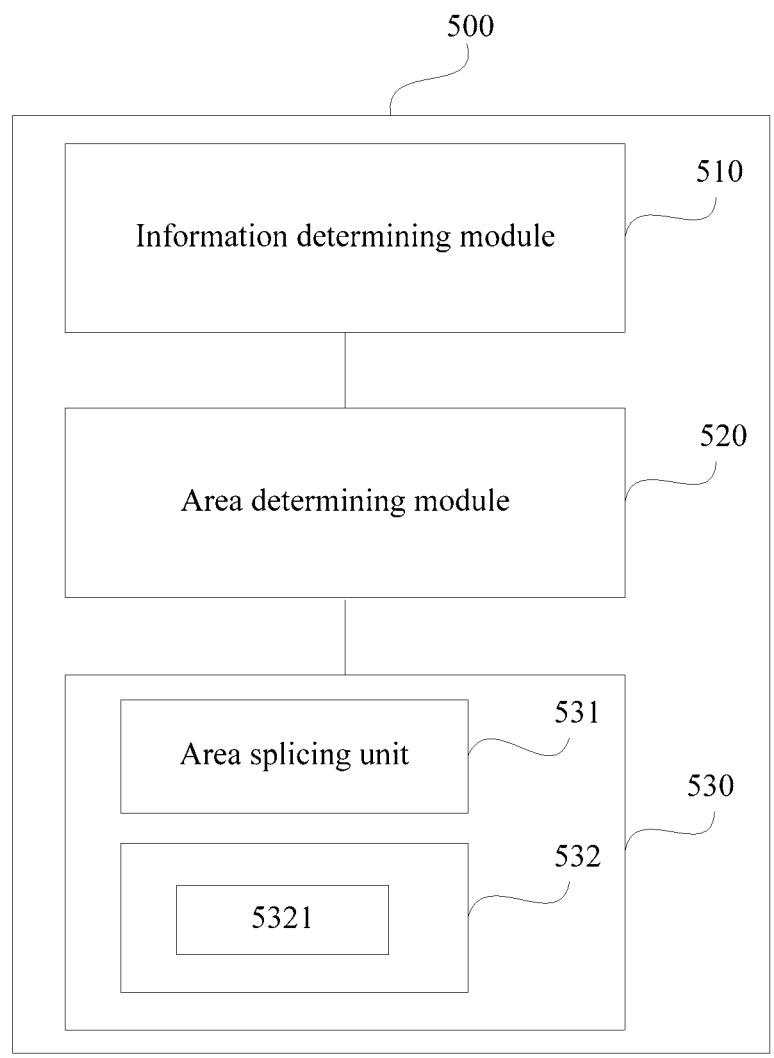

In a possible implementing manner, as shown in FIG. 6e, optionally, the information determining unit 532 comprises:

an information determining subunit 5321, configured to determine, at least according to sound output property information of the interaction area, sound information matching the sound output property information.

In a possible implementing manner, the sound output property information may comprise:

shape information of the interaction area, for example, a size and an outer shape (for example, a rectangle and a circle) of the interaction area.

In another possible implementing manner, the sound output property information may further comprise:

a distribution property of a loudspeaker array corresponding to the interaction area, where the distribution property, for example, may comprise at least one of the following: a quantity, distribution positions, a distribution density, and the like of loudspeaker units.

In still another possible implementing manner, optionally, the sound output property may further comprise:

a loudspeaker property of loudspeaker units in the loudspeaker array, where the loudspeaker property, for example, may comprise: a power property, a frequency response property, and the like.

In a possible implementing manner, the sound output property comprises multiple of the foregoing.

In a possible implementing manner, optionally, the information determining subunit 5321 may find, in a database according to the sound output property information, sound information matching the sound output property information.

In another possible implementing manner, optionally, the information determining subunit 5321 obtains, after acquiring the sound output property information, the sound information through calculation (for example, the HRTF algorithm in the method embodiment).

Figure 6F:
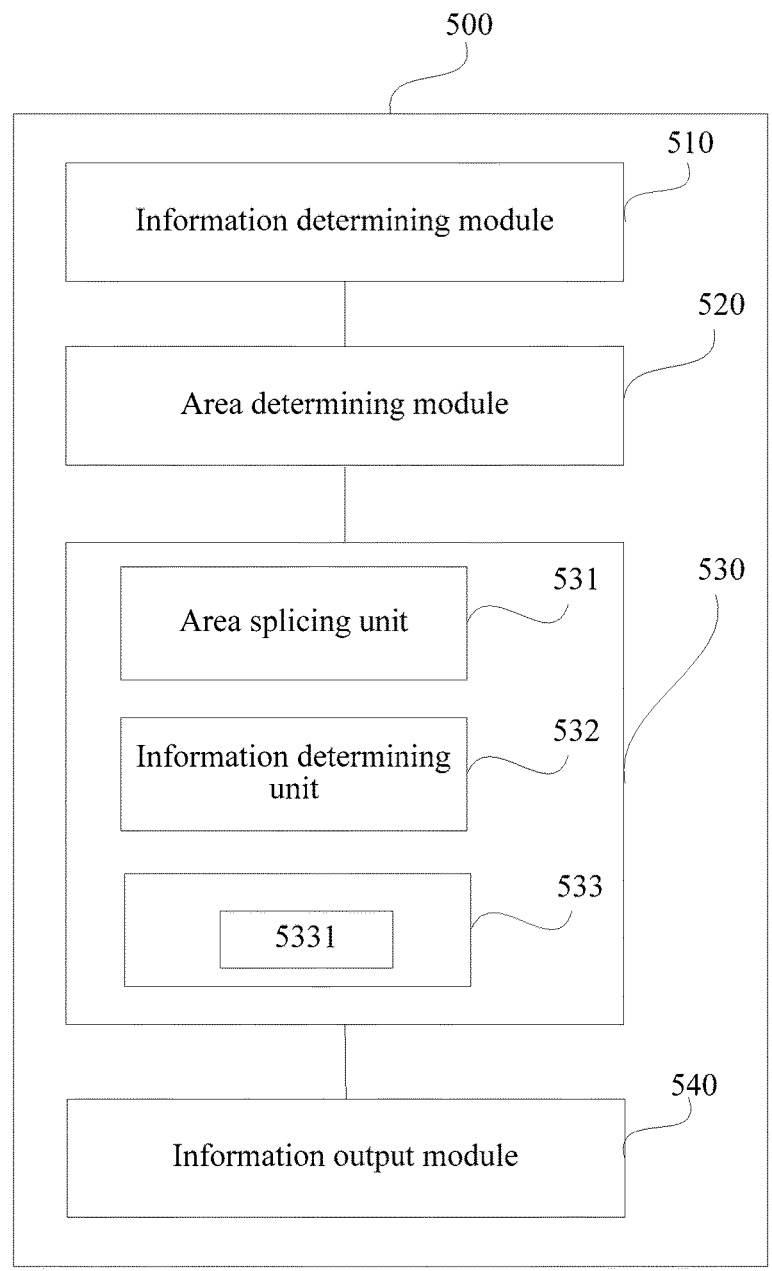

In a possible implementing manner, optionally, as shown in FIG. 6f, the information mapping unit 533 comprises:

a processing subunit 5331, configured to process the sound information according to the first relative position, to obtain multiple pieces of sound sub-information respectively corresponding to the multiple loudspeaker units.

In a possible implementing manner, optionally, as shown in FIG. 6f, the apparatus 500 further comprises:

an information output module 540, configured to present the multiple pieces of sound sub-information by using the multiple loudspeaker units respectively.

For further description of functions of modules and units in this embodiment of the present application, reference may be made to the corresponding description in the foregoing method embodiments.

Figure 7:
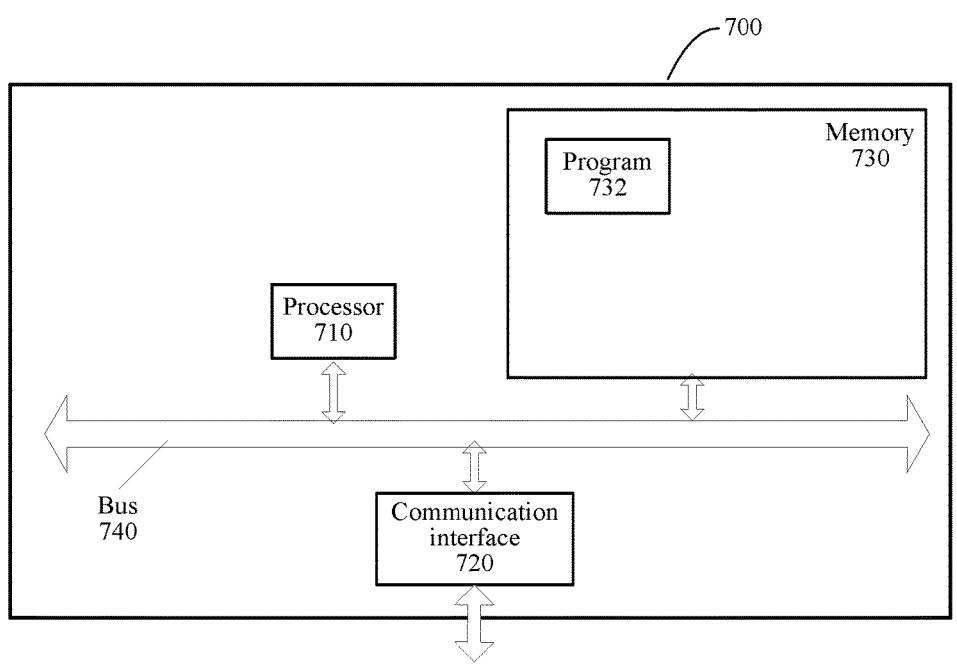
FIG. 7 is a schematic structural block diagram of user equipment according to an embodiment of the present application.

FIG. 7 is a schematic structural diagram of user equipment 700 according to an embodiment of the present application. In a specific embodiment of the present application, a specific implementation of the user equipment 700 is not limited. As shown in FIG. 7, the user equipment 700 may comprise:

a processor 710, a communication interface 720, a memory 730, and a communication bus 740.

The processor 710, the communication interface 720, and the memory 730 accomplish communication with each other by using the communication bus 740.

The communication interface 720 is configured to communicate with a network element such as a client.

The processor 710 is configured to execute a program 732, and specifically may execute related steps in the foregoing method embodiment.

Specifically, the program 732 may comprise program code, where the program code comprises a computer operation instruction.

The processor 710 may be a central processing unit (CPU), or an application specific integrated circuit (ASIC), or may be configured as one or more integrated circuits that implement this embodiment of the present application.

The memory 730 is configured to store the program 732. The memory 730 may comprise a high-speed RAM, or may further comprise a non-volatile memory, for example, at least one magnetic disk memory. The program 732 specifically may be configured to cause the user equipment 700 to execute the following operations:

determining shape related information of a deformable loudspeaker array surface, where the shape related information corresponds to a first shape of the deformable loudspeaker array surface after a folding deformation;

determining multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape; and using the multiple effective interaction areas as one interaction area at least according to a first relative position of the multiple effective interaction areas in the spatial position in the first shape to provide a sound output interface to at least one interaction object.

Reference may be made to corresponding description of corresponding steps and units in the foregoing embodiment for specific implementation of the steps in the program 732, which is no longer elaborated herein. A person skilled in the art may clearly understand that, for convenience and simplicity of description, reference may be made to corresponding process description in the foregoing method embodiment for a specific working process of devices and modules described above, which are no longer elaborated herein.

It can be appreciated by those skilled in the art that each exemplary units and method steps described with reference to the embodiments disclosed in this text can be implemented by electronic hardware or a combination of computer software and electronic hardware. Whether these functions are executed in a hardware mode or a software mode depends on the specific applications and design constraint conditions of the technical solutions. The professional technicians can use different methods to implement the functions described with respect to each specific application, but this implementation should not be considered to go beyond the scope of the present invention.

If the functions are implemented in the form of a software functional unit and is sold or used as an independent product, it can be stored in a computer-readable storage medium. Based on such understanding, the technical solution of the present application essentially or the part which contributes to the prior art or a part of the technical solution can be embodied in the form of a software product, and the computer software product is stored in a storage medium, and comprises several instructions for enabling a computer device (which can be a personal computer, a server, or network equipment, etc.) to execute all or some steps of the method described in each embodiment of the present application. The foregoing storage medium comprises various media which can store a program code, such as a USB disk, a mobile hard disk, a read-only memory (ROM), a random-access memory (RAM), a magnetic disk or a compact disk.

The above implementations are only used to describe the present application, without limiting the present application; various alterations and variants can be made by those skilled in the art without departing from the spirit and scope of the present application, so all equivalent technical solutions also belong to the scope of the present application, and the scope of patent protection of the present application should be defined by claims.

What is claimed is:

1. An interaction method for producing sound using a deformable loudspeaker array, comprising:
   determining shape related information of a deformable loudspeaker array surface, where the shape related information corresponds to a first shape of the deformable loudspeaker array surface after a folding deformation;
   determining multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape;
   using the multiple effective interaction areas as one interaction area at least according to a first relative position of the multiple effective interaction areas in the spatial position in the first shape;
   determining sound information matching the one interaction area; and
   providing a sound output interface for producing sound to at least one interaction object with the one interaction area.

2. The method of claim 1, wherein the shape related information comprises:
   the first shape information of the first shape.

3. The method of claim 1, wherein the shape related information comprises:
   second shape information of a second shape of the deformable loudspeaker array surface before the folding deformation, and deformation information corresponding to the folding deformation.

4. The method of claim 1, wherein
   the shape related information is determined at least according to a deformation control instruction.

5. The method of claim 1, wherein
   the shape related information is determined at least according to deformation sensing information for the deformable loudspeaker array surface.

6. The method of claim 1, wherein the determining multiple effective interaction areas at least according to the shape related information comprises:
   determining the multiple effective interaction areas on the deformable loudspeaker array surface according to the shape related information and a second relative position of an interaction object relative to the deformable loudspeaker array surface after the folding deformation.

7. The method of claim 1, wherein the determining multiple effective interaction areas at least according to the shape related information comprises:
   determining, according to the shape related information, multiple folding areas where multiple outwardly-bending end surfaces are located, where the multiple outwardly-bending end surfaces are adjacent in the spatial position on the deformable loudspeaker array surface in the first shape; and
   determining the multiple effective interaction areas at least according to the multiple folding areas.

8. The method of claim 7, wherein the determining the multiple effective interaction areas at least according to the multiple folding areas comprises:
   the multiple effective interaction areas are the multiple folding areas.

9. The method of claim 7, wherein the determining the multiple effective interaction areas at least according to the multiple folding areas comprises:
   determining the multiple effective interaction areas at least according to the multiple folding areas and the first shape.

10. The method of claim 1, wherein that the multiple effective interaction areas are adjacent in the spatial position comprises:
    for a first effective interaction area of the multiple effective interaction areas, at least another effective interaction area that is adjacent in the spatial position to the first effective interaction area exists,
    where the first effective interaction area is any effective interaction area of the multiple effective interaction areas.

11. The method of claim 1, wherein the using the multiple effective interaction areas as one interaction area at least according to a first relative position comprises:
    performing splicing on the multiple effective interaction areas according to the first relative position to form the one interaction area.

12. The method of claim 1, wherein the using the multiple effective interaction areas as one interaction area comprises:
    mapping the sound information from the one interaction area to multiple loudspeaker units of the multiple effective interaction areas at least according to the first relative position.

13. The method of claim 1, wherein the determining sound information matching the one interaction area comprises:
    determining, at least according to sound output property information of the one interaction area, sound information matching the sound output property information.

14. The method of claim 13, wherein the sound output property information comprises at least one of the following:
    shape information of the one interaction area, a distribution property of a loudspeaker array corresponding to the one interaction area, a loudspeaker property of loudspeaker units in the loudspeaker array.

15. The method of claim 12, wherein the mapping the sound information from the one interaction area to the multiple effective interaction areas according to the first relative position comprises:

processing the sound information according to the first relative position, to obtain multiple pieces of sound sub-information respectively corresponding to the multiple loudspeaker units.

16. The method of claim 15, wherein the using the multiple effective interaction areas as one interaction area further comprises:
presenting the multiple pieces of sound sub-information by using the multiple loudspeaker units respectively.

17. User equipment for producing sound using a deformable loudspeaker array, wherein the user equipment comprises:
a memory, configured to store a program; and
a processor, configured to execute the program stored in the memory, the program causes the processor to execute the following operations:
determining shape related information of a deformable loudspeaker array surface, where the shape related information corresponds to a first shape of the deformable loudspeaker array surface after a folding deformation;
determining multiple effective interaction areas on the deformable loudspeaker array surface at least according to the shape related information, where the multiple effective interaction areas meet the following conditions: in nonadjacent positions on the deformable loudspeaker array surface, and adjacent in a spatial position in the first shape;
using the multiple effective interaction areas as one interaction area at least according to a first relative position of the multiple effective interaction areas in the spatial position in the first shape;
determining sound information matching the one interaction area; and
providing a sound output interface for producing sound to at least one interaction object with the one interaction area.

18. The user equipment of claim 17, wherein the shape related information comprises:
the first shape information of the first shape.

19. The user equipment of claim 17, wherein the shape related information comprises:
second shape information of a second shape of the deformable loudspeaker array surface before the folding deformation, and deformation information corresponding to the folding deformation.

20. The user equipment of claim 17, wherein
the shape related information is determined at least according to a deformation control instruction.

21. The user equipment of claim 17, wherein
the shape related information is determined at least according to deformation sensing information for the deformable loudspeaker array surface.

22. The user equipment of claim 17, wherein the determining multiple effective interaction areas at least according to the shape related information comprises:
determining the multiple effective interaction areas on the deformable loudspeaker array surface according to the shape related information and a second relative position of an interaction object relative to the deformable loudspeaker array surface after the folding deformation.

23. The user equipment of claim 17, wherein the determining multiple effective interaction areas at least according to the shape related information comprises:
determining, according to the shape related information, multiple folding areas where multiple outwardly-bending end surfaces are located, where the multiple outwardly-bending end surfaces are adjacent in the spatial position on the deformable loudspeaker array surface in the first shape; and
determining the multiple effective interaction areas at least according to the multiple folding areas.

24. The user equipment of claim 23, wherein the multiple effective interaction areas are the multiple folding areas.

25. The user equipment of claim 23, wherein the determining the multiple effective interaction areas at least according to the multiple folding areas comprises:
determining the multiple effective interaction areas at least according to the multiple folding areas and the first shape.

26. The user equipment of claim 17, wherein that the multiple effective interaction areas are adjacent in the spatial position comprises:
for a first effective interaction area of the multiple effective interaction areas, at least another effective interaction area that is adjacent in the spatial position to the first effective interaction area exists,
where the first effective interaction area is any effective interaction area of the multiple effective interaction areas.

27. The user equipment of claim 17, wherein the using the multiple effective interaction areas as one interaction area at least according to a first relative position comprises:
performing splicing on the multiple effective interaction areas according to the first relative position to form the one interaction area.

28. The user equipment of claim 17, wherein the using the multiple effective interaction areas as one interaction area comprises:
mapping the sound information from the one interaction area to multiple loudspeaker units of the multiple effective interaction areas at least according to the first relative position.

29. The user equipment of claim 17, wherein the determining sound information matching the one interaction area comprises:
determining, at least according to sound output property information of the one interaction area, sound information matching the sound output property information.

30. The user equipment of claim 29, wherein the sound output property information comprises at least one of the following:
shape information of the one interaction area, a distribution property of a loudspeaker array corresponding to the one interaction area, a loudspeaker property of loudspeaker units in the loudspeaker array.

31. The user equipment of claim 28, wherein the mapping the sound information from the one interaction area to the multiple effective interaction areas according to the first relative position comprises:
processing the sound information according to the first relative position, to obtain multiple pieces of sound sub-information respectively corresponding to the multiple loudspeaker units.

32. The method of claim 31, wherein the using the multiple effective interaction areas as one interaction area further comprises:
presenting the multiple pieces of sound sub-information by using the multiple loudspeaker units respectively.

* * * * *